March 3, 1953 A. D. ARSEM ET AL 2,630,558

IMPROVEMENT IN BALANCED PHASE SPLITTING NETWORK

Filed April 29, 1948

INVENTORS
JOHN R. FORD,
NATHANIEL L. KORMAN
& A. DONALD ARSEM
BY Morris Pahtkin
ATTORNEY Patented Mar. 3, 1953 2,630,558

UNITED STATES PATENT OFFICE 2,630,558

IMPROVEMENT IN BALANCED PHASE SPLITTING NETWORK

Alvan Donald Arsem, Oaklyn, N. J., John Randolph Ford, Narberth, Pa., and Nathaniel I. Korman, Merchantville, N. J., assignors to Radio Corporation of America, a corporation of Delaware Application April 29, 1948, Serial No. 23,938

5 Claims. (Cl. 321—58)

This invention relates to balanced phase-splitting networks, and although not limited thereto, finds particular application in circuits for obtaining a circular trace on the screen of a cathode ray tube.

It is well known that a circular pattern or "sweep" may be obtained on a cathode ray tube by suppling quadrature phase-related sinusoidal voltages of equal magnitude to the horizontal and vertical sets of deflecting plates of the tube. One plate in each set is usually connected to ground and sinusoidal voltages in phase quadrature are supplied to the other plate in each set. However, in such a system the deflecting voltage for either set of plates is not balanced with respect to the anode potential and the cathode ray beam is defocused during parts of the sweep. Furthermore, the sensitivity and angular relation of the deflecting plates usually varies from one tube to another, so that the deflecting voltages require some adjustment when tubes are interchanged. Circuits have been developed for overcoming these difficulties, but such circuits are generally quite complex and involve a relatively large number of circuit elements.

It is one object of the present invention to provide an improved and relatively simple circuit for obtaining a circular sweep pattern in cathode ray tubes.

Another object is to provide balanced, phase-splitting networks for sinusoidal voltages.

Another object is to provide an improved phase-splitting network from which balanced voltages of variable phase and magnitude may be obtained and with a minimum number of circuit elements.

Figure 1:
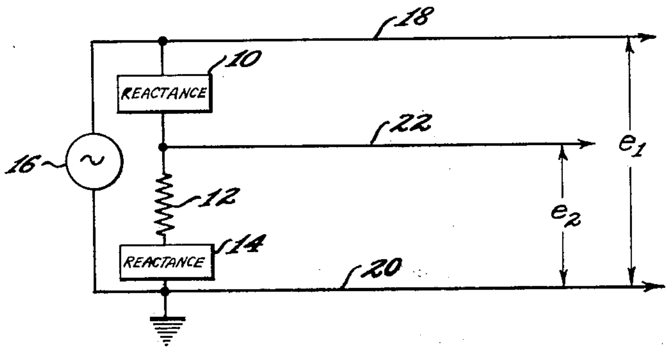
Figure 2:
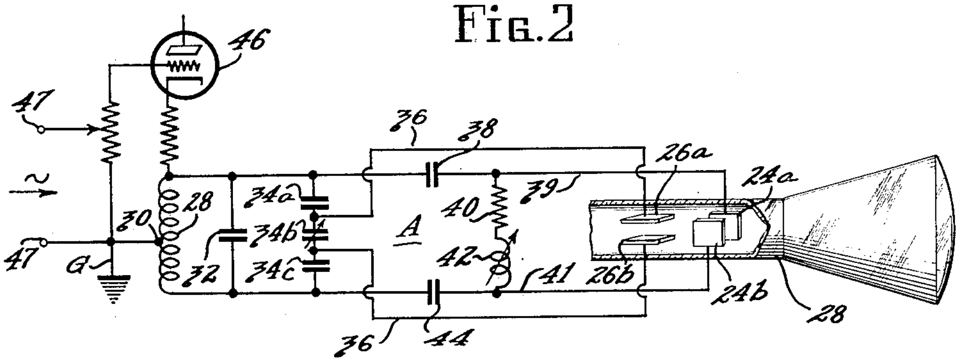
Figure 3:
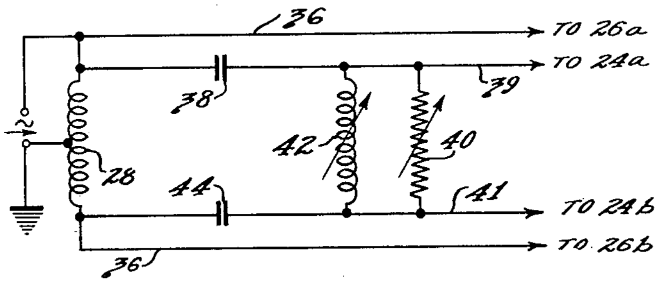

According to the invention, the foregoing and other objects and advantages are obtained by means of phase-splitting networks in which reactances of opposite voltage-current phasing characteristics are utilized to shift the phase of the voltage across an output section of the network from the voltage across the input section of the network. Two output voltages are then made available, one of which is in phase with the voltage across the input section, and the other of which is shifted in phase therefrom. A phase-splitting system of this type lends itself readily to an arrangement of complementary networks from which balanced voltages may be obtained. A more complete understanding of the invention may be had by reference to the following description of illustrative circuits when read with the accompanying drawing in which:

Figure 1 is a circuit diagram of an unbalanced phase-splitting network illustrating the principle on which the present invention is based, Figure 2 is a circuit diagram of one form of balanced phase-splitting network according to our present invention and, Figure 3 is a circuit diagram showing a modification of the circuit of Figure 2.

The theoretical aspects of the invention may be most readily explained with reference to an unbalanced circuit, and accordingly there is shown in Figure 1 an unbalanced phasing circuit including a first reactance 10, a resistor 12, and a second reactance 14, all connected in series with a source of sinusoidal voltage 16. The reactances 10 and 14 can be either inductors or capacitors, as desired, the only limitation being that the reactances 10 and 14 must have opposite current-voltage phasing characteristics. Thus, if the reactance 10 is an inductor, the reactance 14 must be a capacitor, and vice versa. Output connections 18 and 20 are provided from which a first output voltage $e_1$ may be obtained across the entire circuit. An output connection 22 is also provided at the junction of the reactor 10 and the resistor 12, whereby a second output voltage $e_2$ may be obtained from the connection 22 to the connection 20. It will be seen that the relative magnitude and phase of the voltages $e_1$ and $e_2$ will be dependent on the relative impedances of the reactor 10, the resistance 12, and the reactance 14. Assuming that the reactance 10 is an inductor, and that the reactance 14 is a capacitor, then the ratio between the two voltages $e_2$ and $e_1$ may be expressed as:

$$(1) \qquad \frac{e_2}{e_1}=\frac{R-jAR}{R+j(BR-AR)}$$

wherein $e_1$=voltage across the entire network $e_2$=voltage across the resistor 12 and a capacitor 14

$R$=resistance of the resistor 12

A=ratio of the reactance of a capacitor 14 to the resistance R $B$=ratio of the reactance of an inductor 10 to the resistance R $j=\sqrt{-1}$ Equation 1 may be simplified to $$(2) \qquad \frac{e_2}{e_1}=\frac{1-jA}{1+j(B-A)}$$

which may be expanded to $$(3) \qquad \frac{e_2}{e_1}=\frac{A^2-AB+1-jB}{1+(B-A)^2}$$

From Equation 3, the tangent of the angle $\theta$ between the voltages $e_2$ and $e_1$ will be $$\arctan \theta = \frac{B}{A^2 - AB + 1} \tag{4}$$

If it is desired to make $\theta = 90°$, then from Equation 4, it will be seen that $(A^2 - AB + 1)$ must equal zero. Many combinations of values for the two variables A and B can be selected which will satisfy the equation.

$$A^2 - AB + 1 = 0 \tag{5}$$

Thus, by a proper correlation of the relative magnitudes of the resistor and the reactances in the circuit of Figure 1, a 90° phase shift may be obtained between the voltages $e_1$ and $e_2$. Other phase shifts may be obtained by proper solution of Equation 4.

If the voltages $e_1$ and $e_2$ are to be equal in magnitude, then from Equation 2, the ratio of their magnitudes must equal unity, or $$\frac{e_2}{e_1} = \frac{\sqrt{1+A^2}}{\sqrt{1+(B-A)^2}} = 1 \tag{6}$$

In general, it may be stated that various values of A and B may be chosen which will satisfy Equation 5, and for each solution the relative magnitudes of $e_1$ and $e_2$ will differ. The simultaneous solution of Equations 5 and 6 will give values for A and B which will make the voltages $e_1$ and $e_2$ equal, and separated in phase by 90°.

If the reactance 10 is a capacitor, and the reactance 14 is an inductor, then a series of equations similar to Equations 1 through 6 may be developed which will give the relations between the reactances and the resistors for obtaining any desired phase angle and any desired ratio of the voltages $e_1$ and $e_2$.

The circuit of Figure 1 may be arranged to provide a particularly efficient deflection circuit for cathode ray tubes, for the reason that two of the circuits of Figure 1 may be combined into one network from which balanced voltages can be obtained. One such network arrangement A is shown in the circuit of Figure 2. In Figure 2, there is shown a balanced network for supplying deflection voltages to the horizontal and vertical deflecting plates 24, 26 of a conventional cathode ray tube 28 (shown only in partial outline). The network is seen to include an input coil 28 having a center tap 30 connected to any desired voltage reference point G, such as the ground point of the system. A capacitor 32, together with the capacitors 34*a*, 34*b*, and 34*c*, serves to tune the coil 28 approximately to resonance at the desired sweep frequency. The capacitors 34 also constitute a potential divider in which the upper section 34*a* is equal to the lower section 34*c*, whereby a first balanced output voltage may be obtained across the middle section 34*b*. The voltage across section 34*b* is supplied to one set of deflection plates 26 through the connecting leads 36, and it will be seen that the voltage on plate 26*a*, for example, will be equal in magnitude to but opposite in phase from the voltage on the plate 26*b* and hence the voltage for the plates 26 will be balanced. The middle section 34*b* of the capacitors 34 is made variable so that the voltage supplied to the plates 26 may be adjusted to compensate for variations in deflection plate sensitivities.

The phase-splitting section of the network includes a first capacitor 38, a resistor 40, an inductor 42, and a second capacitor 44, all connected in series across the input coil 28. Output leads 39 and 41 are connected to the plates 24*a* and 24*b* of the cathode ray tube from the junction of the capacitor 38 and the resistor 40, and the junction of the capacitor 44 and the inductor 42, respectively. The capacitors 38 and 44 are equal in magnitude, and correspond in function to the reactance 10 in Figure 1. The resistor 40 and the coil 42 correspond in function to the resistor 12 and the reactance 14, respectively, of Figure 1. The similarity of the network of Figure 2 to that of Figure 1 would be more apparent if two resistors were used for the resistor 40, and two inductors for the inductor 42, but it is obvious that these elements may be lumped as shown without changing the operation of the circuit. Since the capacitors 38 and 44 are equal in magnitude, the junction of the capacitor 38 and the resistor 40 will be a point in the network equal in potential to the junction point of capacitor 44 and the coil 42. The same considerations which were outlined for the circuit of Figure 1, in Equations 1 through 6, will apply to the circuit of Figure 2, except that the reactance in the ratio "A" of Equations 1 through 6 is now the sum of the capacitive reactances of capacitors 38 and 44, the reactance in the ratio "B" of Equations 1 through 6 is the inductive reactance of inductor 42, and the output voltages are balanced rather than unbalanced as in the circuit of Figure 1.

The network A of Figure 2 may be energized in any desired manner, as by placing the input coil 28 in the cathode circuit of a vacuum tube 46 to the grid of which a sinusoidal voltage may be applied through the input terminals 47. The sinusoidal voltage across the input section of the network A will then be modified in the circuit in the manner described, and a circular sweep pattern may be obtained on the screen of the cathode ray tube.

In Figure 3, a modified arrangement of the circuit of Figure 2 is shown, in which the resistor 40 and its associated reactance 42 in the phasing circuit are placed in parallel with each other, rather than in series, as was the case with the circuit of Figure 2. The circuit of Figure 3 is slightly more flexible than that of Figure 2, because 90° phase shift may be obtained in the circuit of Figure 3 when the sum of the impedances of the capacitors 38 and 44 is equal to the impedance of the inductor 42, with any finite value of resistance for the resistor 40. Hence, the relative magnitudes of the voltages to the two sets of plates can be varied without disturbing their 90° phase relationship, whereas in the circuit of Figure 2, 90° phase shift is dependent on the relative values of the capacitors 38 and 44, the inductor 42, and the resistor 40. This can be seen from the fact that Equation 5 is not satisfied for $A=B$, whereas comparable equations for the circuit of Figure 3 will show that 90° phase shift will be obtained in the circuit of Figure 3 with $A=B$. Hence, the voltage divider capacitors 34*a*, 34*b*, and 34*c* in the circuit of Figure 2 can be eliminated in the circuit of Figure 3 with no sacrifice in flexibility.

It will be appreciated that the same considerations apply as to the characteristics of reactances 38, 42, and 44 in Figures 2 and 3 that were specified for the reactances of Figure 1. Thus, the reactances 38, and 44 can be either inductors or capacitors, as long as their current-voltage phasing characteristics are opposite to that of the reactance 42.

Since many changes could be made, within the scope and spirit of the invention, in the circuits shown and described, the foregoing is to be construed as illustrative and not in a limiting sense.

What is claimed is:

1. A balanced phase-splitting network comprising a source of sinusoidal voltage, an input circuit having a voltage reference point established thereon, means for energizing said input circuit from said source, means for obtaining from said input circuit a first output voltage between points equipotentially distant from said reference point, a phase-splitting circuit connected between said equipotential points on said input circuit and including (1) first and second reactances of equal magnitude having similar voltage-current phasing characteristics, (2) a third reactance having a voltage-current phasing characteristic opposite to that of said first and second reactances and (3) a resistor, a connection from one terminal of said first reactance to one of said equipotential points, a connection from one terminal of said second reactance to the other of said equipotential points, connections from the other terminals of said first and second reactances to said third reactance and said resistor, and output connections from the said other terminals of said first and second reactances.

2. A balanced phase-splitting network comprising a source of sinusoidal voltage, an input circuit having a voltage reference point established thereon, means for energizing said input circuit from said source, an impedance connected between points equipotentially distant from said reference point, output connections from points on said impedance equipotentially distant from said reference point, a phase-splitting circuit connected between said equipotential points on said input circuit and including, (1) first and second reactances of equal magnitude having similar voltage-current phasing characteristics, (2) a third reactance having a voltage-current phasing characteristic opposite to that of said first and second reactances and (3) a resistor, a connection from one terminal of said first reactance to one of said equipotential points, a connection from one terminal of said second reactance to the other of said equipotential points, connections from the other terminals of said first and second reactances to said third reactance and said resistor, and output connections from the said other terminals of said first and second reactances.

3. A phase-splitting network comprising a source of sinusoidal voltage, an input circuit having a voltage reference point established thereon, means for energizing said input circuit from said source, means for obtaining from said input circuit a first output voltage between points equipotentially distant from said reference point, a phase-splitting circuit connected between said equipotential points on said input circuit and including (1) first and second capacitors of equal magnitude, (2) an inductor and (3) a resistor, a connection from one terminal of said first capacitor to one of said equipotential points, a connection from one terminal of said second capacitor to the other of said equipotential points, connections from the other terminals of said first and second capacitors to said inductor and said resistor, and output connections from the said other terminals of said first and second capacitors.

4. A phase-splitting network comprising a source of sinusoidal voltage, an input circuit having a voltage reference point established thereon, means for energizing said input circuit from said source, means for obtaining from said input circuit a first output voltage between points equipotentially distant from said reference point, a phase-splitting circuit connected between said equipotential points on said input circuit and including, (1) first and second reactances of equal magnitude having similar voltage-current phasing characteristics, (2) a third reactance having a voltage-current phasing characteristic opposite to that of said first and second reactances and (3) a resistor, said third reactance and said resistor being connected in parallel, a connection from one terminal of said first reactance to one of said equipotential points, a connection from one terminal of said second reactance to the other of said equipotential points, connections from the other terminals of said first and second reactances to said third reactance and said resistor, and output connections from the said other terminals of said first and second reactances.

5. The invention as set forth in claim 4, and wherein said first and second reactances are capacitors, and said third reactance is an inductor.

ALVAN DONALD ARSEM.
JOHN RANDOLPH FORD.
NATHANIEL I. KORMAN.

REFERENCES CITED

The following references are of record in the file of this patent:

UNITED STATES PATENTS

| Number | Name | Date |
|---|---|---|
| 2,147,728 | Wintringham | Feb. 21, 1939 |
| 2,157,178 | Kellog | May 9, 1939 |
| 2,253,053 | Stevens et al. | Aug. 19, 1941 |
| 2,397,840 | Crosby | Apr. 2, 1946 |
| 2,421,747 | Engelhardt | June 10, 1947 |
| 2,467,863 | Short | Apr. 19, 1949 |
| 2,471,516 | Bryant | May 31, 1949 |
| 2,526,858 | Epstein et al. | Oct. 24, 1950 |